United States Patent [19]

Gutierrez

[11] Patent Number: 5,193,978
[45] Date of Patent: Mar. 16, 1993

[54] ARTICULATED BLADE WITH AUTOMATIC PITCH AND CAMBER CONTROL

[76] Inventor: Bill Gutierrez, 3428 Belmont Ave., El Cerrito, Calif. 94530

[21] Appl. No.: 764,166

[22] Filed: Sep. 23, 1991

[51] Int. Cl.⁵ .............................................. F03D 3/00
[52] U.S. Cl. .................................... 416/24; 416/17; 416/119; 416/132 B
[58] Field of Search .................... 416/10, 17, 23, 24, 416/119, 131, 132 B; 415/4.1, 4.2, 4.4

[56] References Cited

U.S. PATENT DOCUMENTS

| | | | |
|---|---|---|---|
| 3,129,769 | 4/1964 | Hofbauer et al. | 416/24 |
| 3,877,836 | 4/1975 | Tompkins | 416/23 |
| 4,299,537 | 11/1981 | Evans | 416/132 B |
| 4,316,700 | 2/1982 | Schramm | 416/144 |
| 4,383,801 | 5/1983 | Pryor | 416/17 |
| 4,415,312 | 11/1983 | Brenneman | 416/132 B |
| 4,776,762 | 10/1988 | Blowers, Sr. | 416/17 |

Primary Examiner—Edward K. Look
Assistant Examiner—Michael S. Lee

[57] ABSTRACT

An articulated blade whose forward vane section is directly pitched by relative fluid flow upon it, and whose rear deflector section deflects the flow upon it. A control arm, through parallelogram linkage, maintains the deflector in parallel orientation with it, thus cambering the blade when it pitches. Fluid is deflected always in a direction controlled by orientation of the control arm. High lift-drag ratios are possible at high angles of attack. The blade can be used to extract power from the fluid, or for propulsion through a fluid.

2 Claims, 8 Drawing Sheets

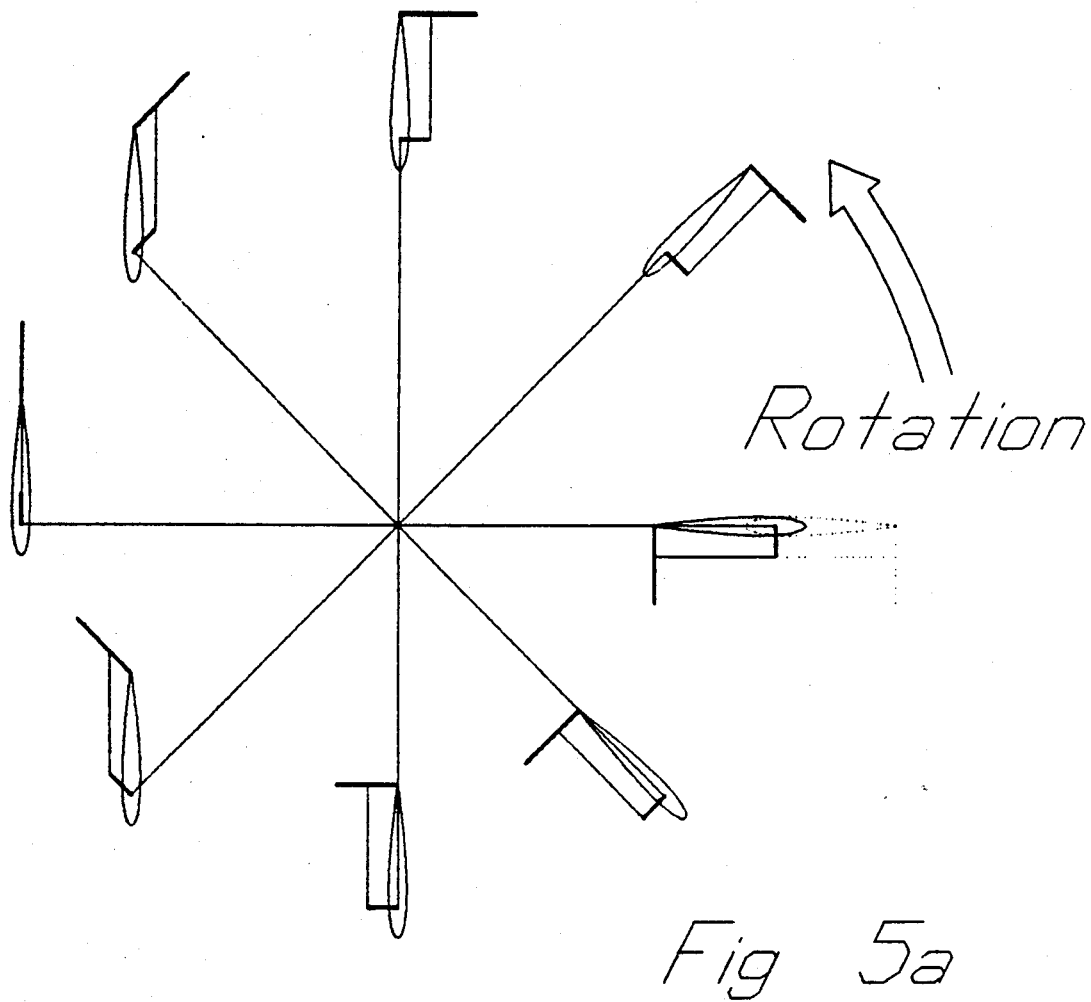
Fig 5a
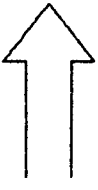

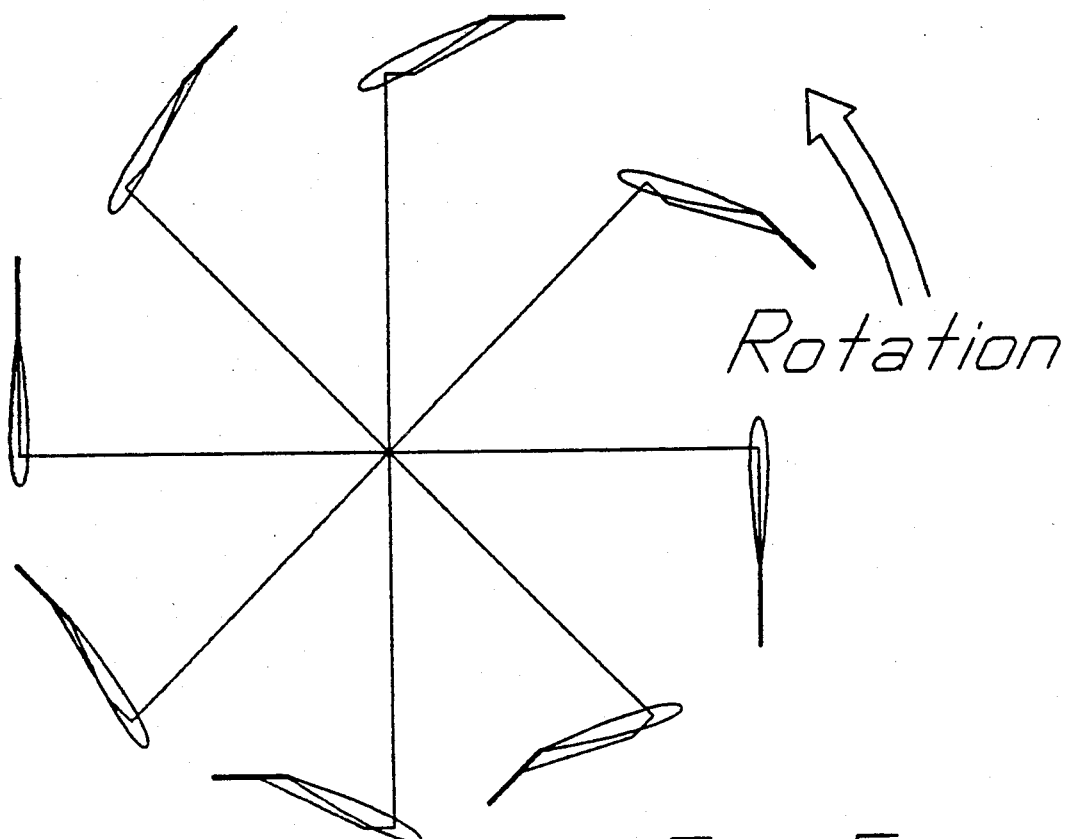
Fig 5c
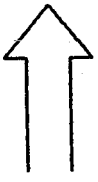

Wind Direction

ARTICULATED BLADE WITH AUTOMATIC PITCH AND CAMBER CONTROL

BACKGROUND—FIELD OF INVENTION

This invention relates generally to wind turbines and more specifically to fluid deflecting blades and blade pitch control.

BACKGROUND—PRIOR ART

At present, the wind-axis turbine is much more popular for energy conversion than the cross-wind axis turbine. The former has its blades radiating out from a central axis, like a propeller. This rotational axis must align with the wind for energy production, thus the term wind-axis.

The cross-wind-axis turbine has its axis of rotation, about which its blades revolve, perpendicular to the wind. The darrieus and the cyclogiro are good examples of this kind of turbine.

Though more abundant, the wind-axis turbine has several drawbacks that the cross-wind-axis turbine doesn't have, one of which is the need to align its axis with the wind. Besides requiring an aligning mechanism, efficiency is affected. The greater the rate of change of wind direction the lower the efficiency. The cross-wind-axis turbine, having a stationary axis, has no axis-aligning mechanism to affect efficiency.

The wind-axis turbine must be elevated to allow ground clearance for the blades. Since its generator is also held aloft, a tall, and strong, support structure must be used. The cross-wind-axis turbine can be designed to have more or less self-supporting blades, and because its axis is stationary and vertical, its generator can be stationary and at ground-level.

The blade of the wind-axis turbine radiates from the axis. It thus is moving at different speeds along its span. Also, it is only supported at one end of its span, at its root. These factors complicate blade design and manufacture: twisting to maintain proper pitch along the span; variation in chord and thickness, along the span, for strength and efficiency of operation. The cross-wind-axis blade, as in the cyclogiro, can be much simpler, without twist or chord changes, without sacrificing efficiency, and can be supported at both span ends.

One cross-wind turbine, the cyclogiro, is considered to have a higher theoretical maximum energy conversion efficiency than wind-axis turbines.

Another advantage of the cross-wind-axis turbine is in modularity and efficient use of space. Wind-axis turbines present circular areas to the wind, cross-wind axis turbines can present rectangular areas. Adjacent circles either overlap or waste space between them, rectangles don't need to overlap to cover all the space between them. But beyond that, cross-wind turbines are more easily stacked than wind axis turbines.

Currently designed cross-wind axis turbines do have drawbacks but to understand these drawbacks requires an analysis of the forces on these turbines.

Cross-axis turbines can be driven by lift and/or drag forces. Drag is the force on the blade in the general direction of the wind. Lift is generally perpendicular to wind direction. Drag-driven turbines, such as the savonius, are relatively inefficient because the drag force aids forward motion only through half a cycle, but impede on the other half cycle. Blade speed is limited to wind speed, also limiting energy extraction. Their one advantage is self-starting.

Lift-driven cross-axis turbines have had two major problems, an inability to self-start, and stalling in gusty winds. These problems are due to blade pitch control (or lack of it), and to blade design. Pitch is the angle the blade chord makes with some other direction, usually that of the wind, or the direction of blade motion. By controlling pitch, drag and lift can be used to start a turbine rotating. Once moving, pitch control can avoid stall caused by high drag on the blades.

Pitch control mechanisms have had several drawbacks. Usually a central sensor measures wind direction and/or speed, a power amplifier amplifies the sensor's information, and actuates gears, cams or linkages to pivot, or pitch, the vanes. The first drawback is that the vanes are not reacting to their local wind conditions, but to conditions at a remote sensor. Second, pitch control is not individualized. Third, energy is required to run the power amplifier. Fourth, the pitching mechanism can be more complex than the wind turbine itself.

The problem with blade design comes into play when the blade is pitched.

Current lift-drive, cross-wind-axis turbines have blades comprising fixed shape airfoils, symmetrical about straight chords, that is, with no camber, or, concavity. Camber increases lift, but only if the wind is coming from one side of the blade, the concave side. On aircraft, the wind generally hits the wings from below, but on cross-wind turbines the wind comes from either side. A wind turbine blade would have to invert its camber, when the wind hitting it changed sides.

When not pitched the flow exits the uncambered blade antiparallel to the blade chord and therefore antiparallel to blade momentum. When the blade is pitched, though, the flow still follows the contours of the airfoil, exiting antiparallel to the blade chord. But since the blade is pitched, the flow's redirection is at this pitch angle, away from that direction that would impart the most forward momentum to the blade. In other words, lift would increase at pitch, if the exiting flow were directed still antiparallel to blade momentum.

It appears that with current blades, pitching is more for drag reduction than for increased lift.

OBJECTS AND ADVANTAGES

Accordingly, several objects and advantages of my invention are:

I. When used on a cross-wind-axis turbine:
  A. Self-starting. Drag and lift produce a high starting torque. This is similar to drag-driven turbines, without the disadvantage of a high drag opposing forward motion, but also with the advantage of lift.
  B. Non-stalling: Drag forces that oppose forward motion are always very small. If an external wind exists, the net force on the turbine is always in a forward direction. Wind gusts change blade pitch, preventing high drag.
  C. Greater energy extraction. The blade's deflector is always oriented to maximize momentum transfer. This momentum is always in the forward direction, in other words, higher lift and lower drag.
  D. Individualized blade pitch control.
  E. Automatic operation—no external controls or monitoring are required.

II. Low cost turbines using this invention can be built as wind breaks in areas where high winds are a problem.

III. Blade coefficient of drag drops as speed increases.

IV. Simplicity of the pitching mechanism
A. In type and number of parts—no gears, cams, belts or pulleys. Optimally, besides the blade, only one additional part, the swing arm may be needed.
B. In construction—parallelogram linkage of four main parts, two of which are the blade's vane and deflector.
C. In operation—wind turns vane which actuates linkage which reorients deflector.

V. Direct and immediate pitching and cambering response—Only the immediately local wind is involved, and it directly and immediately changes the pitch and camber.

VI. This combined blade and pitch control can be used as a propulsion device. Moving the control arm perpendicular to the desired travel direction, (and perpendicular to the blade span) gives rise to a force in the travel direction.

DESCRIPTION OF DRAWINGS

FIGS. 1-5 show my invention attached to an arm of a turbine. The pitch here is the angle the vane chord makes with the blade travel direction.

FIG. 1 is a perspective view at a zero degree pitch.
FIG. 2 is a perspective view at a 30 degree pitch.
FIG. 3 is a plan view at a zero degree pitch.
FIG. 4 is a plan view at a 30 degree pitch.
FIGS. 5a–d are plan views of the blade at different blade speeds, with a wind speed greater than zero.
FIG. 5a is for a blade speed of zero, at startup.
FIG. 5b is for a blade speed equal to wind speed.
FIG. 5c is for a blade speed twice wind speed.
FIG. 5d is for a blade speed three times wind speed.

REFERENCE NUMERALS IN DRAWINGS

| | |
|---|---|
| 10 vane | 12 deflector |
| 14 hinge joining vane and deflector | 16 control arm |
| 18 pivot pin | 20 pivot pin |
| 22 swing arm | 24 pivot pin |
| 26 counterweight | 28 turbine arm |

DESCRIPTION AND OPERATION OF INVENTION

Figure 1:
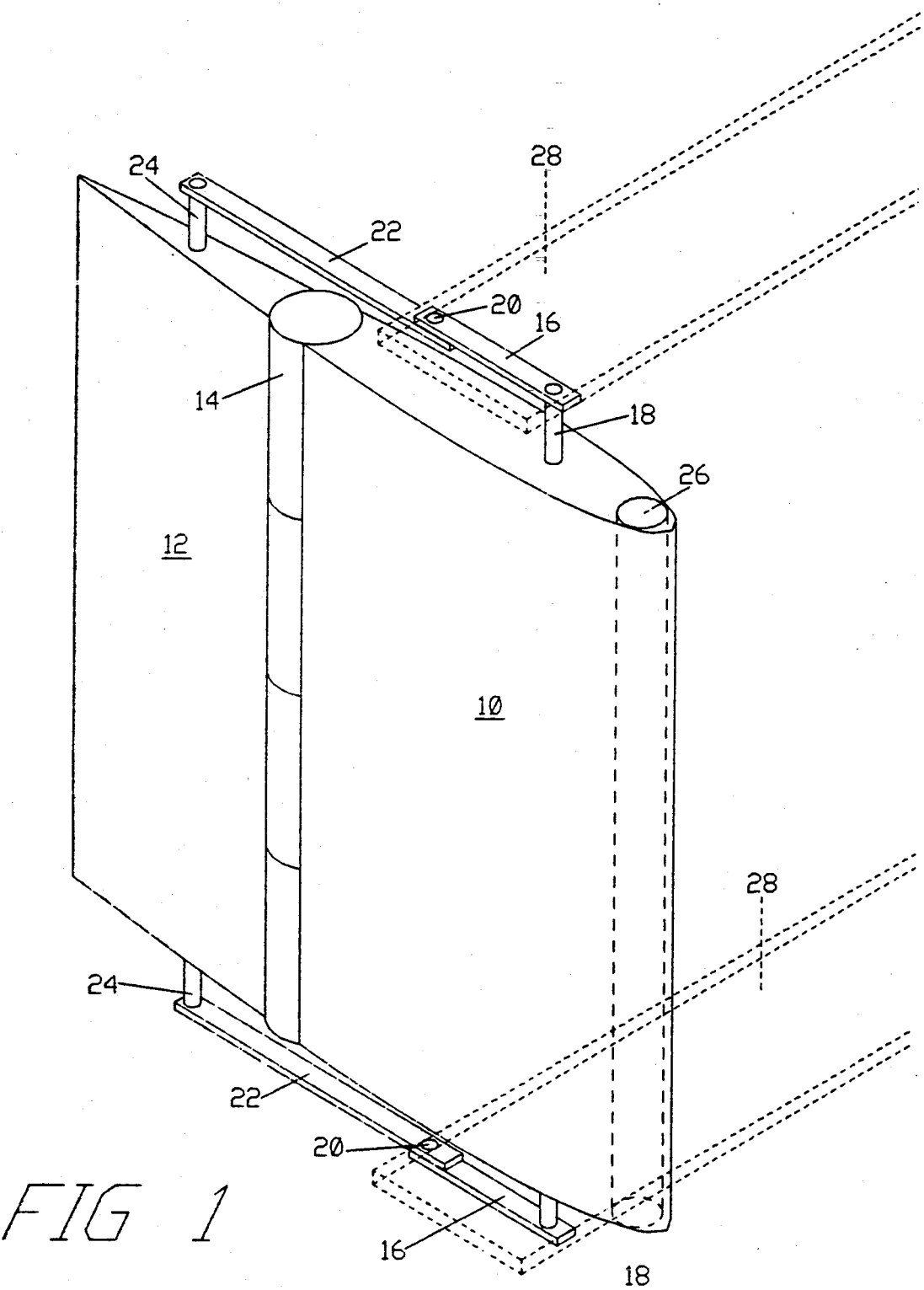
Figure 2:
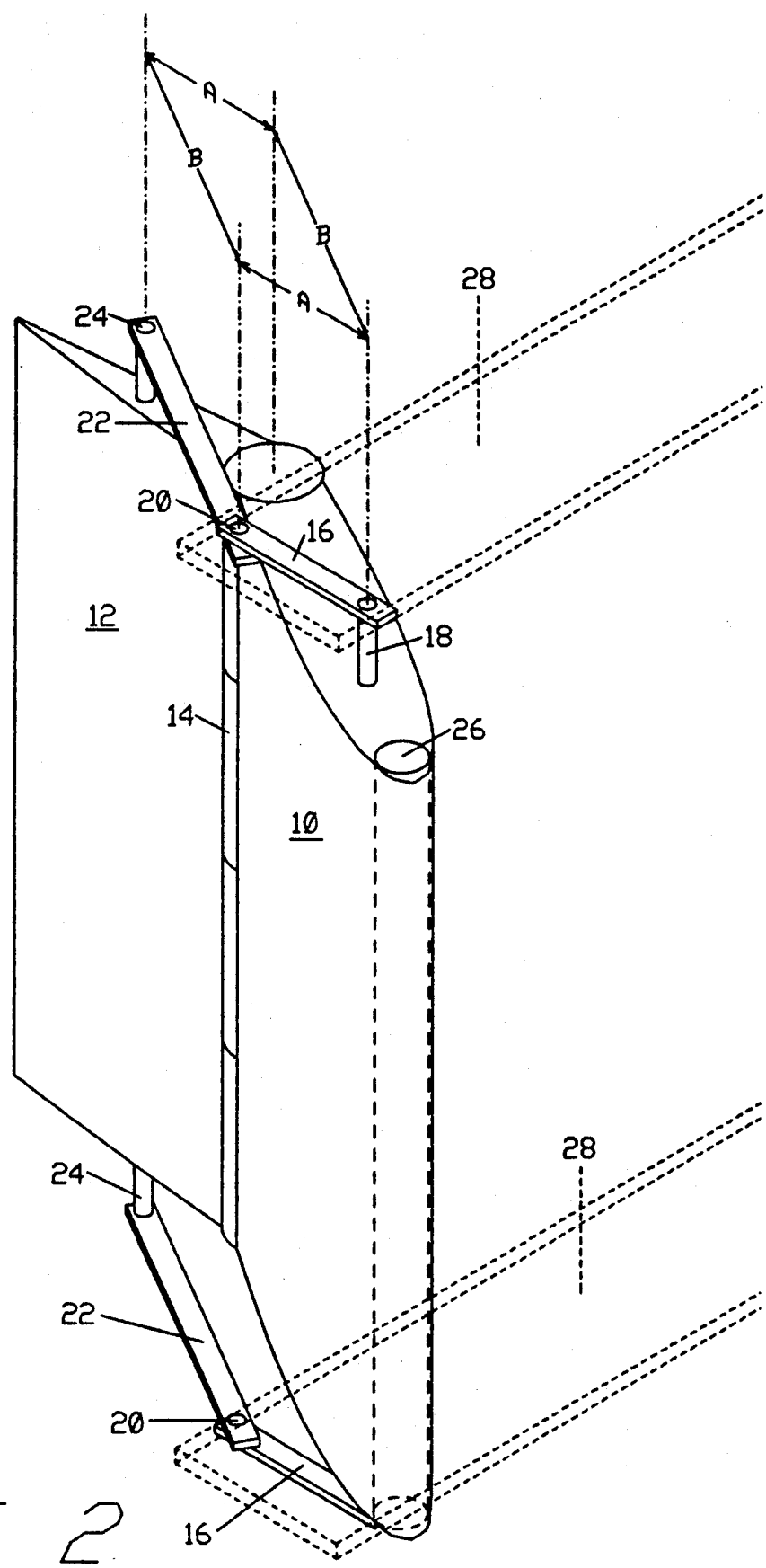

FIGS. 1 and 2 are perspective views of a basic version of the invention, attached to a turbine arm.

The articulated blade comprises a forward vane 10 and a rear deflector 12 connected by a hinge 14. Counterweight 26, running the span of the blade near the leading edge, is needed only when centrifugal forces arise, as when the blade is used on a turbine. The blade's interior may be hollow or solid but counterweight 26 should be made of denser material.

The pitch and camber control mechanism comprises a control arm 16, hinged at one end to the vane 10 by pivot pin 18. Control arm 16 is pivotally connected, at its other end, to one end of swing arm 22 by pivot pin 20. Swing arm 22 is pivotally connected, at its other end, to deflector 12 by pivot pin 24. Control arm 16 is firmly attached to turbine arm 28 so that it always lies parallel to the direction of travel of the blade and the turbine arm.

FIG. 1 shows the vane at a zero pitch to the travel direction.

FIG. 2 shows the vane at a 30 degree pitch to the travel direction. The dimensions A, B, A', and B' represent the distances between the four centerlines associated with hinge 14, and pins 18, 20, and 24.

Figure 3:
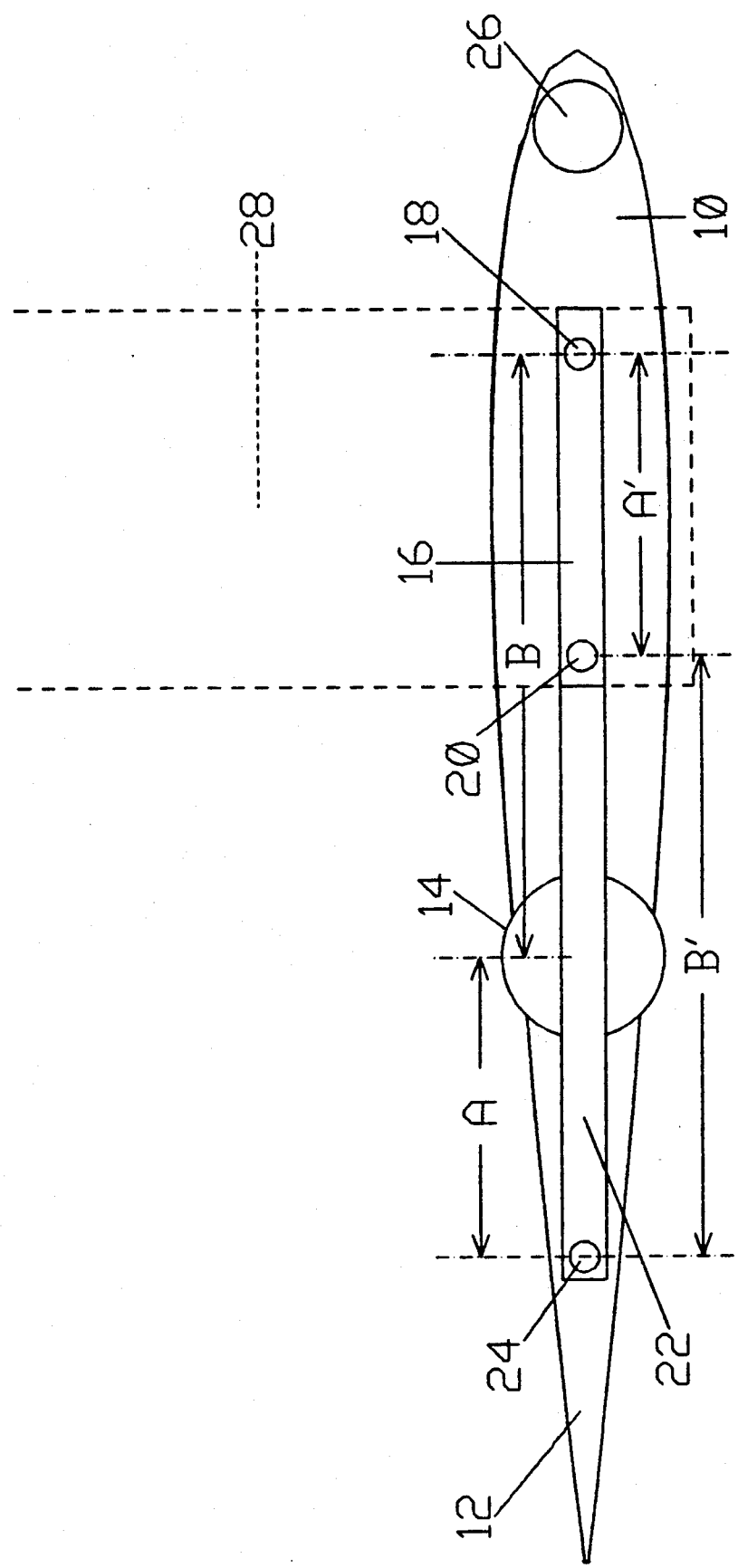
Figure 4:
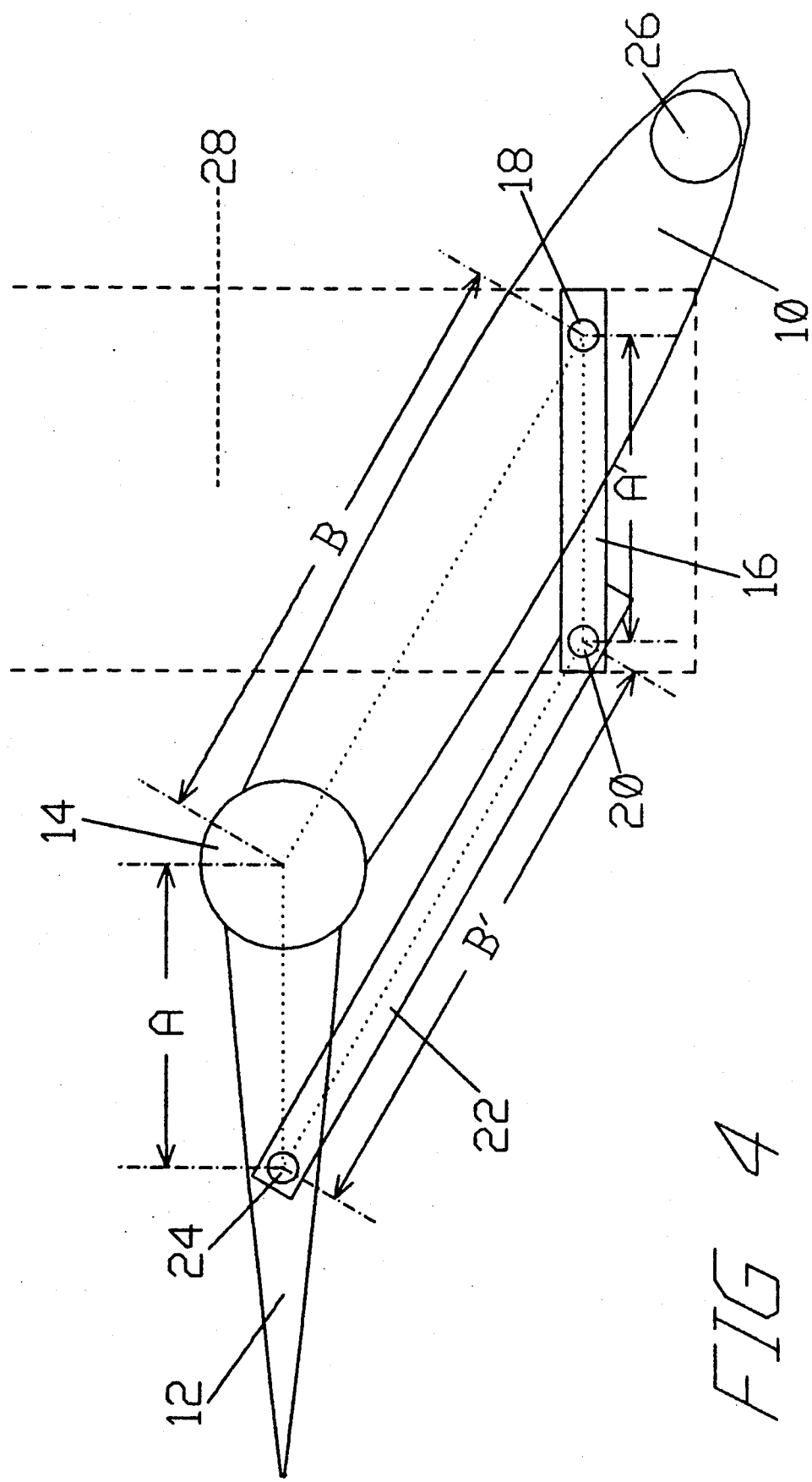

FIGS. 3 and 4, corresponding to FIGS. 1 and 2 respectively, are plan views of the blade. These figures again show the distance relationships between the four rotational centerlines of hinge 14, and pins 18, 20, and 24. FIG. 4 shows the necessary parallelogram, indicated by the dotted lines, formed by these four rotational centers. The parallelogram linkage assures that, relative to the control arm, the deflector section has only translational motion.

Pin 18 is positioned on the forward part of the vane so the vane will turn into the wind, allowing, if necessary, for counterweighting forward of the pin. The amount of counterweighting is that amount that allows for the center of mass to lie on the centerline of pin 18, the vane's axis of rotation.

Pin 24 is positioned to account for various forces but a reasonable starting position is, as shown, midway on the deflector.

Once pins 18 and 24 are positioned, pin 20 is positioned on the control and swing arms so as to complete the parallelogram. As shown in the plan views of FIGS. 3 an 4, pin 20 is positioned on the control arm by making A equal A'. Pin 20 is positioned on the swing arm to make B' equal B.

Thus the vane, deflector and two arms form a parallelogram linkage, with hinge 14 and the three pins 18, 20, 24 providing the connections and the rotational means. This means the deflector, opposite the control arm, is always parallel to it. Thus, the deflector is always parallel to the travel direction.

In operation, a wind hitting vane 10 will rotate it about the axis running through the center of pin 18, the vane axis. The vane, as a wind vane, will tend to align with the wind. In rotating, vane 10 will pull deflector 12 along with it but since deflector 12 is also connected to swing arm 22, deflector 12 is constrained in its movement. The parallelogram linkage constrains deflector 12 to remain oriented parallel to control arm 16. Since control arm 16 is fixed parallel to the travel direction, deflector 12 always directs the flow in the best possible direction. Moving pin 24 closer to the trailing edge of the deflector may cause over reaction on the part of the blade. Moving pin 18 forward on the vane should reduce reaction time. Experiment will produce the best positions.

FIGS. 5a–d (plan views) are meant to convey the pitch and camber of the blade at various speeds (relative to the wind) and wind directions. Therefore, the blade is shown simplified in order to show vane pitch and deflector orientation. Each figure represents a different blade to wind speed ratio, from zero in FIG. 5a, to three in FIG. 5d. The overall maximum pitch is set at 90 degrees, but can be changed. Although the wind is constant in direction each blade position represents a relatively different wind direction.

Figure 5B:
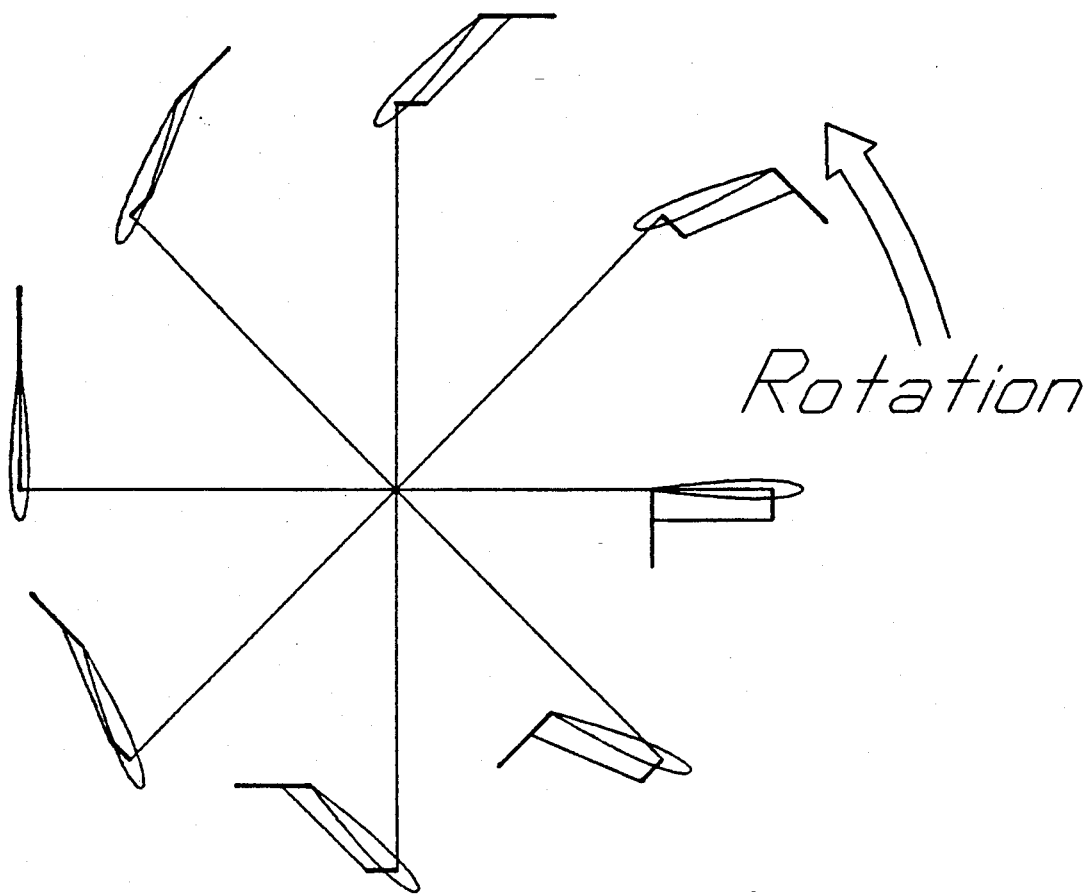

FIG. 5a shows the blade at startup when the speed ratio equals zero. The vane turns directly into the wind except when this would require a pitch greater than 90 degrees. At each position it should be obvious that the net force on the blade is in the forward direction except when the blade direction is directly into the wind. At this position there is very little drag opposing forward motion. Note that the parallelogram linkage keeps the deflector positioned parallel to blade travel direction, deflecting the wind in the best direction for forward movement. When blade direction is with the wind, drag is the primary force. When the blade's forward direction is against the wind, drag is much lower and lift is the primary force. The dotted blade outline represents a second pitch and camber possibility but should produce the same net forward force FIG. 5b shows conditions when blade speed equals wind speed (a speed ratio of one). The difference here is that the vane doesn't point into the wind except when the blade and wind direction are antiparallel. This is because the vane is also sensing a wind due to blade motion. The vane thus turns into the net wind. This net wind is the vector sum of the original wind plus the wind due to blade motion. The wind due to blade motion is just the negative of the blade velocity. Thus the net wind is original wind velocity minus blade velocity. The vane direction, therefore, is the negative of the net wind direction, or, the direction indicated by the blade velocity minus the wind velocity. Note that these vectors are based on a stationary origin, whereas vane pitch is usually measured relative to the moving turbine arm. FIG. 5b should demonstrate that, except when blade and wind are parallel, the net force at each position is in the forward direction.

As the blade gains more speed, the net wind more closely parallels the blade travel direction, opposite in direction of course. Maximum pitch is therefore reduced. The average drag coefficient, therefore, is smaller than at lower speed ratios. Lift is also the sole driving force.

Figure 5D:
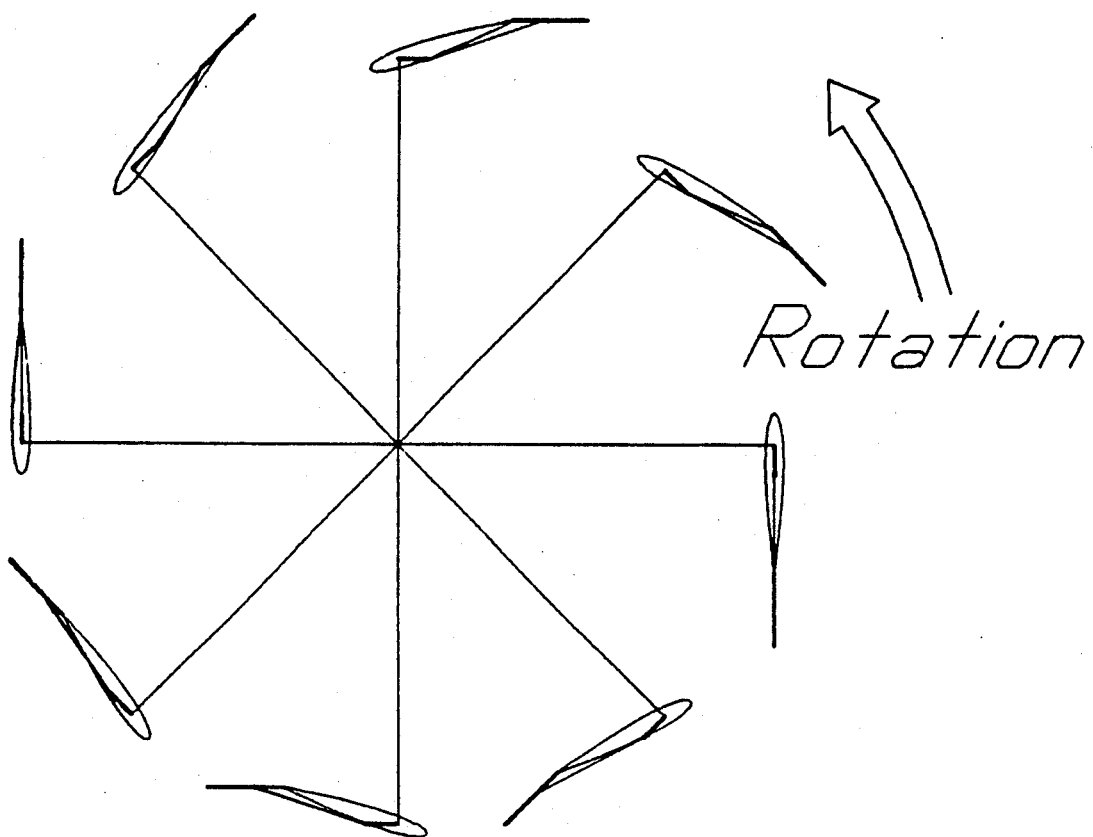

FIGS. 5c and 5d show conditions when blade speed is two and three times wind speed, respectively. It is within this range of speed ratios that such a turbine will most likely run. In this range, maximum pitch is about 26 degrees when the speed ratio is two, dropping to about 18 degrees at a speed ratio of three. Once again net forces, as in FIG. 5b, are in the forward direction.

As an example, assume a steady wind of 10 mph begins. The turbine now starts to rotate. This is represented by FIG. 5a. Blade speed soon reaches 10 mph, corresponding to FIG. 5b. Eventually, blade speed will range between 20 and 30 mph (FIGS. 5c and 5d). If now the wind gusts to 20–30 mph the speed ratios will drop to around one and conditions will return to those shown in FIG. 5b. Thus, a wind gust will change the pitch and chamber pattern, that of a lower speed ratio. This not only prevents the turbine from stalling, more importantly, much of the increased wind energy is then extracted.

Besides energy extraction, the blade and control mechanism can also be used as a propulsion device by, for example, push-pulling the control arms in a direction perpendicular to the vane axis. This action automatically pitches the vane, reducing drag, but since the deflector is still oriented parallel to the control arm a force develops perpendicular to the push-pull direction. This force can be used for propulsion and has the advantage of a high lift to drag ratio. And, as before, as the forward blade speed increases, decreasing maximum pitch, the blade's coefficient of drag will go down. The advantage is that the bi-directional push-pulling produces a generally unidirectional, transverse (lifting) force, parallel to the control arm, and, at a low drag.

Although the descriptions above contain many specificities, this should not be construed as limiting the scope of the invention but as merely providing illustrations of some of the presently preferred embodiments of this invention. For example, multiple blades can be hooked together, separated by their pitch and camber controls, by lengthening pins 18 and 24 to join succeeding blades, enabling each control and swing arm to be used by two blades. Thus the scope of the invention should be determined by the appended claims and their legal equivalents, rather than by the examples given.

I claim:

1. an articulated blade with automatic pitch and camber control comprising:
   (a) a forward vane section of the blade, a vane axis about which the vane rotates by rotational means, and which is parallel to the blade's leading edge, said forward vane section pitched about the vane axis by the action of relative fluid flow, such that the blade's leading edge is pitched into the flow, thus reducing drag on the blade,
   (b) a rear deflector section, of the blade, connected to the vane by hinge means,
   (c) a control arm connected by pivoting means to the vane at the vane axis and connected by parallelogram linkage means to the deflector, so that the deflector is free to translate with the vane but is constrained to remain always oriented parallel to the control arm, thus changing the camber of the blade, diverting fluid flow always parallel to the control arm, thereby enabling the blade to obtain a high lift in the direction pointed by the control arm, and at a low drag due to the pitching of the vane.

2. The invention of claim 1 used for energy extraction wherein the control arm is attached to a fluid flow turbine so that the control arm is always parallel to its intended direction of travel, further including a counterweight placed between the vane axis and the blade's leading edge and running the span of the blade, to prevent centrifugal forces from affecting the pitch of the blade, thus using the high lift and low drag characteristics of the blade to extract energy from the fluid.

* * * * *